United States Patent [19]

Shores

[11] Patent Number: 4,630,329

[45] Date of Patent: Dec. 23, 1986

[54] VACUUM ASSISTED FLEA COMBING DEVICE

[76] Inventor: Stephen Shores, 1112 N. Britain, Irving, Tex. 75061

[21] Appl. No.: 730,501

[22] Filed: May 6, 1985

[51] Int. Cl.$^4$ ............................................. A01M 1/06
[52] U.S. Cl. ...................................... 15/368; 15/352; 15/402; 43/139
[58] Field of Search ................ 15/344, 368, 373, 402, 15/416; 43/139

[56] References Cited

U.S. PATENT DOCUMENTS

| | | | |
|---|---|---|---|
| 1,228,176 | 5/1917 | Bishop | 15/402 X |
| 2,017,780 | 10/1935 | Walters | 119/84 |
| 2,228,091 | 1/1941 | Smith | 15/402 |
| 2,555,941 | 6/1951 | Snowman | 15/397 |
| 2,648,867 | 8/1953 | Erling | 15/402 X |
| 3,209,386 | 10/1965 | Weber | 15/344 |
| 3,626,546 | 12/1971 | Dove | 15/402 |
| 3,668,736 | 6/1972 | Loscalzo | 15/402 |
| 3,771,192 | 11/1973 | Zaleski | 15/330 |
| 4,100,644 | 7/1978 | Johansson | 15/402 X |
| 4,279,095 | 7/1981 | Aasen | 43/139 |
| 4,485,583 | 12/1984 | Planty | 15/402 X |

OTHER PUBLICATIONS

Marketing brochure, "Protect Your Pet from Poisons", by Stephen Shores, dba Shoresystems, First published and distributed Jun. 11, 1984, (Copy attached).

*Primary Examiner*—Chris K. Moore
*Attorney, Agent, or Firm*—Robert G. Boydston

[57] ABSTRACT

Fleas and flea eggs are removed from an animal's coat by combing the fleas and flea eggs from the coat and into a vacuum cleaner-created air stream flowing through an insecticide-treated filter bag. A flea comb carried in a vacuuming device is adjustable to comb long-haired and short-haired animal pets at different angles of attack. A flea trap, containing a porous filter treated with an insecticide, is connected to the comb-carrying vacuuming device by a flexible hose and to a vacuum cleaner by an additional hose.

4 Claims, 8 Drawing Figures

VACUUM ASSISTED FLEA COMBING DEVICE

BACKGROUND OF THE INVENTION

1. Field of the Invention

The present invention relates to methods and means for removal of fleas and flea eggs from household pets without the use of insect killing chemicals on the pets.

2. Description of the Prior Art

The common flea, pulex irritans, of the order Siphonaptera, is a tiny wingless insect seldom seen by humans but its presence is often felt in a most discomforting manner by humans and animals, particularly household pets, throughout most parts of the world. This parasitic creature lives on or in close proximity to many animals, particularly household pets, and derives its nourishment from animal blood while using the animal's coat as a host for its eggs. The wingless flea has limbs adapted for great leaping ability that it uses to leap from 6 to 12 inches onto a host animal from any convenient waiting station such as bedding, carpet, a crack in a wooden floor, grass, weeds, and the like. Using a suctorial proboscis on its head, also armed with piercing mandibles, the flea inflicts an irritating and often painful bite to obtain the blood upon which it depends for nourishment. Disease bacteria are often carried by the flea and transmitted in the course of the bite.

Pet owners go to great lengths to eradicate or lessen the numbers of fleas by using spray and powder insecticides in their pets' surroundings indoors and out of doors. Combs, brushes, diet supplements and insecticidal shampoos are also used in an often futile attempt to ward off or remove the fleas that regularly invade the pets' coats. Insecticidal dips, powders, sprays and flea collars are used on the pet in further attempts to eradicate the pesky flea; yet the flea problem is a constant and reoccurring irritant to pet and owner alike. Where fleas are numerous they often inflict their irritating bits on humans as well as on their pets.

No matter how valiantly the owner battles the flea the war is seldom won and relief for pet and owner is usually short-lived as the flea population tends to return again and again. Even the pet owner who succeeds in eradicating the flea from his pet and premises faces reinfestation from infested pets on adjoining premises or wild birds and animals that can also carry the flea.

The insecticides that have proven effective contain rather harsh chemicals that are frequently irritating to man and animal alike. To even approach effective insecticidal control of fleas the pet owner must subject himself and his pet to regular bathing, combing and drying of the pet, a process that seems to increase geometrically in difficulty as the size of the pet increases and is always quite time consuming. Bathing with an insecticidal shampoo only kills the live fleas that are contacted in the bathing process and usually leaves eggs in the animal's coat to hatch very soon after the bath is completed. To protect a bathed pet from reinfestation, the pet must be dipped in a harsh chemical solution, powdered, sprayed or equipped with an insecticide impregnated flea collar. The results are usually less than satisfactory as the insecticidal protection from fleas soon breaks down and dissipates. The chemicals in the insecticides can easily burn and irritate the skin, eyes, mucous membranes and genital areas of the pet as well as subjecting the owner to similar irritation and discomfort in the process of applying the insecticide to the pet. General environmental pollution from the insecticides is an obvious and undesirable collateral result.

Flea combs consisting of closely spaced plastic or metal tines have long been used as means for mechanical removal of fleas, particularly by pet owners who do not wish to subject themselves, the pet or their premises to the harsh chemicals of the insecticides. However, combing, while it may remove some of the fleas and flea eggs, does little more to most live fleas than move them about. Flea removal vacuum systems have also been tried, particularly the system disclosed by the invention of Aasen, U.S. Pat. No. 4,279,095, which teaches the use of a rather coarse brush of flexible, hollow rubber or plastic tubes to agitate the pet's coat and draw the disturbed fleas and eggs by vacuum through a plenum chamber to a trapping filter. Application of sufficient vacuum to remove a meaningful percentage of the flea population hiding in and clinging to the coat of a particular pet has proven difficult in practice because the vacuum effect of a household vacuum cleaner alone does not effectively gather in a significant percentage of the live fleas on a pet.

SUMMARY OF THE INVENTION

The present invention includes a method and device for combining mechanical and vacuum removal of fleas and flea eggs from a pet's coat. The method requires use of a flea comb having closely spaced tines through which neither fleas nor eggs can pass, in combination with the simultaneous application of a vacuum to draw the fleas to a trapping chamber where a killing insecticide is applied. A common household vacuum chamber or central vacuum cleaning system will supply sufficient vacuum to draw the dislodged fleas from the comb into a suitable trapping chamber. The device is comprised of a vacuum cleaner attachment that includes both a flea comb and an insecticide treated trapping chamber suitably arranged for attachment to and use with any common household vacuum cleaner or central system.

A vacuum plenum chamber and associated rigid tubular vacuum pipe suitable for manipulation as a combing tool is arranged with a flea comb at an opening to the plenum chamber so that vacuum is applied directly to the comb as the device is manipulated to comb fleas and eggs from the pet's coat. From the down stream end of a tubular handle a flexible vacuum conduit extends to a trapping chamber that is further connected on its down stream end by another flexible conduit to the vacuum source. Alternatively, the trapping chamber can be built into a small, portable vacuum cleaner. Within the trapping chamber an insecticide treated filter is positioned to trap fleas and eggs while the air stream drawn by the vacuum travels on to the vacuum cleaner or system source. The use of flexible vacuum conduit allows the operative combing end of the device to be freely manipulated in combing the pet while the vacuum source can be somewhat remotely located. The noise associated with many vacuum cleaners is often disturbing to the pet and remote location is frequently desirable to disassociate the disturbing noise from the combing process.

Because pets, particularly dogs and cats of various breeds, have coats of hair varying in length and density it is desirable that the operative combing end of the device have a comb for which the angle of attack to the pet's coat can be adjusted. Even on the coat of one pet there is frequently great variation in the hair length and density on different parts of the pet's body. Therefore the comb is arranged for an adjustable angle of attack that can be made quite acute for a short-haired pet and opened to a much greater angle for long-haired pets. The adjustable feature also allows for easier cleaning of hair from the tines of the comb on long-haired pets, from which much more hair is usually removed by the combing process than is removed from short-haired pets.

Use of an insecticide treated filter within an enclosed trapping chamber keeps the pet completely removed from the flea killing insecticide and provides for minimum exposure of the pet owner to such insecticide. During the vacuum combing process the dislodged fleas and eggs are held in the trapping chamber by the air flow toward the vacuum source. Upon completion of the combing process the trapping chamber, still connected to the flexible conduit, is hung vertically with the open, entrance end oriented upwardly from a convenient chair back, door knob or wall hook for a few minutes to ensure killing of all fleas by the insecticide.

Thus with a few minutes of vacuum combing per day a pet owner can effectively control or eliminate the flea population on the pet without engaging in the time consuming, messy bathing procedure and without the use of the harsh irritating insecticides directly on the pet. The ease with which this method of flea control can be accomplished in a very short time provides great incentive to the pet owner to devote the desired frequency of attention to the pet's flea problem. The device is largely constructed from commonly available, standard production materials so that no expensive casting or molding of special parts is required.

DESCRIPTION OF THE PREFERRED EMBODIMENTS OF THE INVENTION

Figure 1:
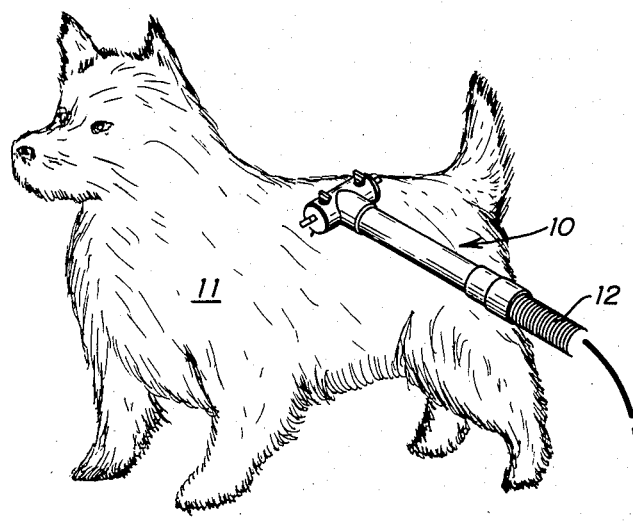
FIG. 1 is a pespective view of the vacuum assisted flea combing device with the associated flea trapping chamber, interconnecting flexible conduit and a vacuum cleaner as a source of vacuum.

FIG. 1 illustrates a vacuum assisted flea combing device 10 as it is used for flea and flea egg removal on a pet 11. The device 10 is connected by flexible, hollow conduit 12 to a flea trapping chamber 13 that is connected by additional flexible conduit 12a to a vacuum cleaner 14. The hollow conduit and flea trapping chamber provide for vacuum communication from the vacuum cleaner 14 directly to the device 10; the "vacuum" resulting in the known manner from air being continuously exhausted from the device, tubing, trapping chamber and vacuum cleaner by a fan, blower or vacuum pump within the vacuum cleaner. Thus, air at atmospheric pressure flows through any opening of the device to the exhaust port of the vacuum cleaner. The only airflow opening to the system described is the transverse slot 25 shown in FIGS. 3, 4, 5 and 7. Thus, the entire air stream drawn by the vacuum cleaner 14 flows across the flea comb 24, carrying dislodged fleas and flea eggs into and through the combing device 10 as is more fully described in the following paragraphs.

Figure 2:
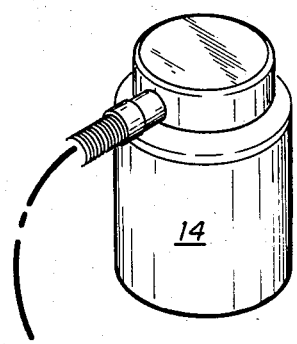
FIG. 2 is a top plan view of the vacuum assisted flea combing device.
Figure 2:
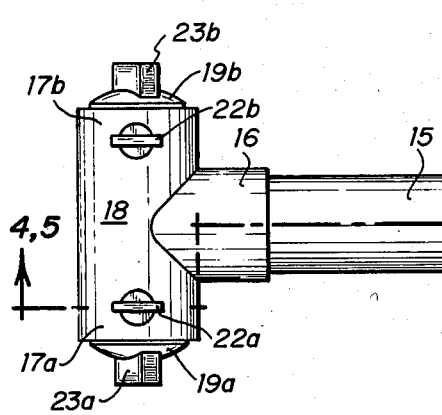

The device 10 is shown in FIG. 2 to include a rigid, hollow stem 15, typically cylindrical, affixed at one end to the flexible hollow tubing 12; the means of affixing usually being a slidable, friction fit of the inside cylindrical surface of the tubing 12 over the outside cylindrical surface of the stem 15, as with many household vacuum cleaner attachable devices. The other end of the stem 15 is rigidly attached by gluing, welding or otherwise attaching the outer surface of the stem end within the inner surface of the center port 16, extending at right angles to end ports 17a and 17b, of a hollow "T" head 18. The reader will quickly understand the structures of the comb device 10, and trapping chamber 13, by envisioning common plastic or metal pipe and fittings used in the plumbing trade.

Figure 3:
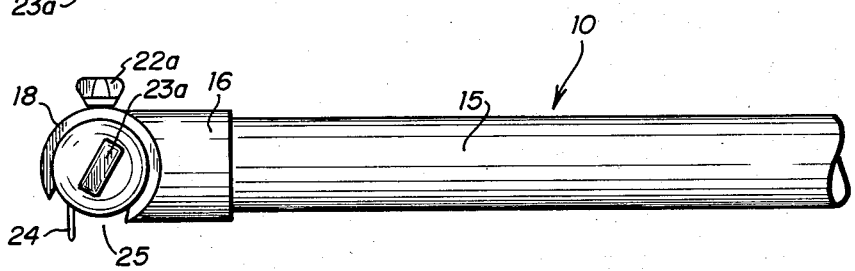
FIG. 3 is a side elevation view of the vacuum assisted flea combing device.
Figure 4:
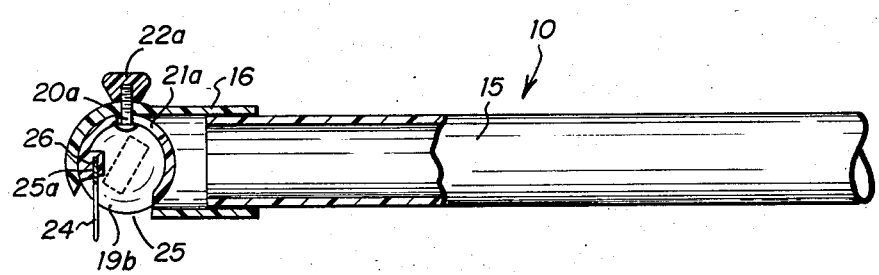
FIG. 4 is a partial section taken along the line 4—4 of FIG. 3.
Figure 5:
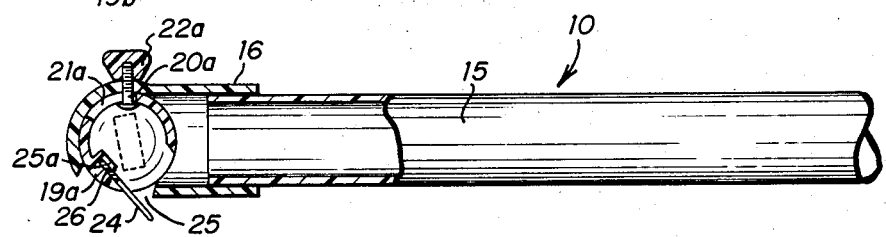
FIG. 5 is a partial sectional view taken along the line 5—5 of FIG. 3, except with the comb positioned for a more acute angle of attack.
Figure 7:
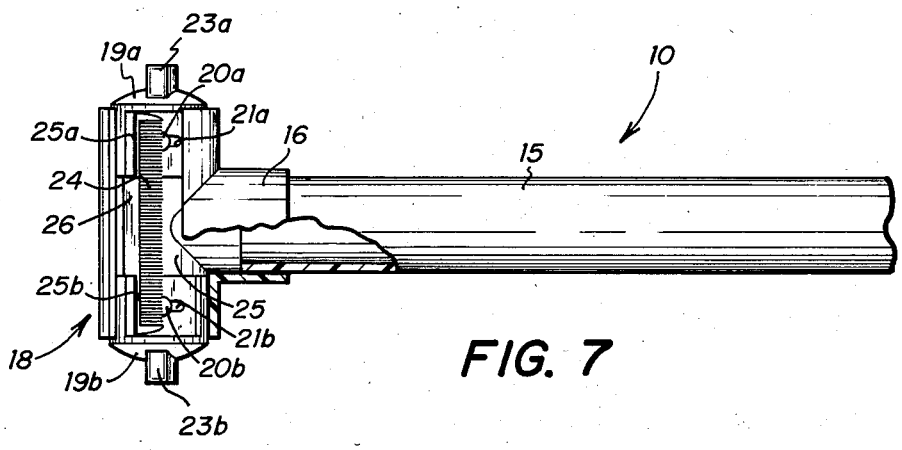
FIG. 7 is a bottom plan view of the vacuum assisted flea combing device, partially broken away to show the assembly to internal components.

Referring to FIG. 4, along with FIGS. 2, 3 and 7, end caps 19a and 19b are positioned in transverse end ports 17a and 17b with loose friction fits between the tubular extensions of the end caps 19a and 19b and the inner cylindrical surfaces of the transverse end ports 17a and 17b. The end caps are rotatable around the longitudinal axis of the "T" head 18, with position retaining bolts 20a and 20b extended through slots 21a and 21b in the tubular extensions of the end caps 19a and 19b and also through bolt holes in the head 18 to exterior wing nuts 22a and 22b. Rotation handles 23a and 23b are provided on the end caps 19a and 19b. Tightened wing nuts hold the end caps 19a and 19b in desired positions by squeezing the end caps 19a and 19b and the head 18 together between the bolt heads and wing nuts; and, loosened wing nuts allow for end cap rotation around the longitudinal axis to the extent of the equal arc lengths of the slots 21a and 21b. A flea comb 24 is held by tight friction fits between slots 25a and 25b in the tubular extensions of the end caps 19a and 19b and the back plate 26 of the comb 24.

Figure 6:
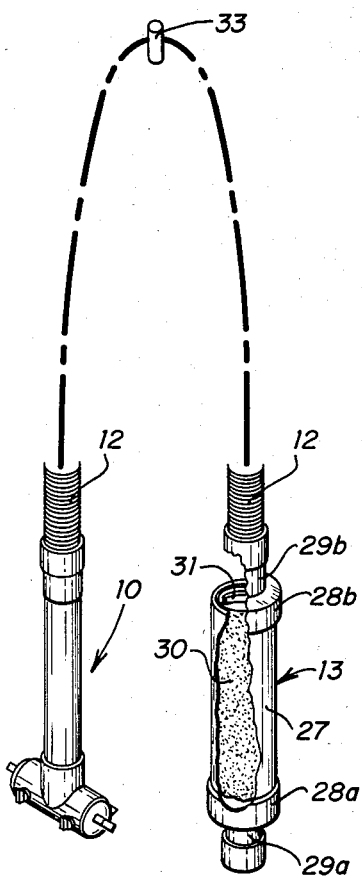
FIG. 6 is a perspective view of the vacuum assisted flea combing device, conduit and flea trapping chamber, suspended from a wall peg, partially broken away to show the internal parts of the flea trapping chamber.

The flea trapping chamber 13 of FIG. 6 includes a central cylindrical tube 27 and end caps 28a and 28b. An integral cylindrical inlet tube 29b extends externally from the inlet end cap 28b and an integral cylindrical outlet tube 29a extends externally from outlet end cap 28a so that the chamber 13 can be connected to flexble tubing 12 and 12a by friction fits as with the tubular extension 15 of the device 10 in the manner described above. A porous, disposable bag filter 30 is positioned within the chamber 13 with its open end facing the chamber inlet tube 29a. The filter 30 can be insecticidally treated by impregnating it with flea killing insecticide or by attaching an insecticide impregnated strip of material 31 to the interior of the filter 30. Outlet end cap 28a is normally attached to the central tube 27 by gluing, welding or other suitable means while inlet end cap 28b is normally pushed over the end of central tube 27 with a slidable friction fit to facilitate insertion and removal of the disposable filter 30.

Figure 8:
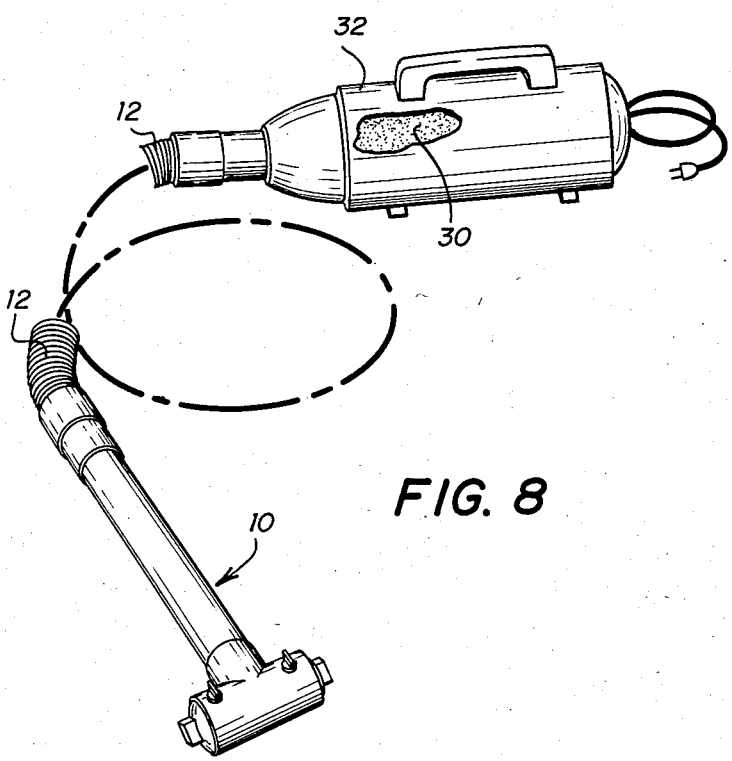
FIG. 8 is a perspective view of an alternate embodiment where the flea trapping chamber is integrally formed in a portable vacuum cleaner, partially broken away to show a disposable filter disposed therein.

In the alternate embodiment of FIG. 8 a portable vacuum cleaner 32 is connected to the device 10 by flexible vacuum hose 12. An insecticide treated, disposable, porous filter bag 30 is positioned inside the vacuum cleaner 32 in the location provided for regular vacuum cleaner disposable filter bags; thus, the separate flea trapping chamber 13 described above is not needed.

With the stem 15 used as a handle, the device 10 is manually drawn over the pet's coat, as in FIG. 1, in the direction of the flexible conduit 12 with the tines of the comb 24 reaching into the coat as with any hair comb. Thus, as depicted in FIG. 1, the device 10 would be manipulated in a combing manner from the pet's head to rear end topside to feet. Because the tines are closely spaced, fleas and flea eggs cannot pass between the tines but the spacing does allow for coat hair to pass between the tines. Some loose hair is picked up on the tines and most of this hair becomes entangled on the tines while the remainder is carried into the interior of the device 10 along with dislodged fleas and flea eggs by the air stream flowing toward the vacuum cleaner 14.

The loose, matted hair that collects on the tines of the comb 24 is manually removed periodically as needed. On long-haired, heavy-coated pets the amount of loose hair collected in this manner is much greater than on short-haired pets. Drawing the tines through heavy, long coats is more difficult than through a short, lighter coat. To facilitate combing on both long and short-haired pets, the arc length of the slots 21a and 21b is sufficient to allow the comb 24 to be positioned at an approximate right angle to the stem 15 as in FIG. 4 or at any acute angle down to the approximate forty-five degree angle depicted in FIG. 5. With the comb 24 in the right angle position of FIG. 4, a relatively large suction opening 25 into the "T" head 18 is obtained so that the greater amount of loose hair normally combed from the coat of a long-haired pet is collected on and removable from the comb 24 tines and to some extent, as described above, vacuumed into the device 10 to be carried by the air stream to the filter 30. The right angle position also provides maximum extension of the tines outside of the "T" head 18 so the tines can comb more deeply into the coat of a long-haired pet. Conversely, the acute angle position of FIG. 5 for the comb 24 minimizes the size of the suction opening 25 and minimizes the external extension of the comb 24 tines. The extreme acute angle position is used on very short-haired pets because less loose hair must be accomodated and the tines need extend only a short distance to reach through the pet's coat to its underlying skin. For pets having medium length hair, a comb angle between the right angle shown and extreme acute angle shown would ordinarily be used.

Upon completion of the vacuum combing process on a pet, the user simply suspends the device 10 and flea trapping chamber 13, or the portable vacuum cleaner 32 in the case of the alternate embodiment, from approximately the midpoint of the flexible tubing 12 on a wall peg 33 or other convenient object. With the wall peg 33 at least fourteen inches above the inlet end cap 28b of the trapping chamber 13, no flea can jump high enough to escape from the disposable filter bag 30 and all fleas are killed in a few minutes by the insecticide. Then the disposable filter bag 30 can be removed and discarded or emptied and reused until the insecticide looses effectiveness.

Whereas this invention has been herein illustrated and described with respect to particular embodiments, it should be realized that modifications and variations may be made in the practice of the invention without departing from the essential contributions to the art made by the teachings hereof. Therefore, the scope of this invention is defined by the claims that follow and is not limited by the embodiments and implementation depicted and described above.

I claim:

1. A flea combing devise comprising: a vacuum system hollow head including a cylindrical transverse member having a transverse port; a flea comb affixed to said cylindrical transverse member with tines of said flea comb extended through said transverse port; a cylindrical exhaust port member of the hollow head means extending from the cylindrical transverse member at right angles thereto; a hollow cylindrical exhaust extension affixed to and extending coaxially from the exhaust port member; and a means for adjusting a vertical axis of the flea comb from a position at a right angle to a longitudinal axis of the exhaust port member to a multiplicity of acute angle positions to said longitudinal axis.

2. The device of claim 1, further comprising:
a hollow flea trapping chamber in communication with the cylindrical exhaust port member through an interconnecting flexible conduit; and having a removable end cap for insertion and removal of an insecticide treated porous filter disposed in the chamber.

3. The device of claim 2, further comprising:
a cylindrical exhaust port member extending from the flea trapping chamber in communication with the interior thereof and suitably arranged for coupling to a vacuum cleaner through a second flexible conduit.

4. The device of claim 2, further comprising:
a portable vacuum cleaner having the hollow flea trapping chamber built into an intake end and in communication with an air moving means of the vacuum cleaner through an internal passageway thereof.

* * * * *